(12) United States Patent
Zhang (10) Patent No.: US 10,528,783 B2
(45) Date of Patent: Jan. 7, 2020

(54) DISPLAY SCREEN HAVING FINGERPRINT ACQUISITION FUNCTION

(71) Applicant: Vkansee (Beijing) Technology Co., Ltd., Beijing (CN)

(72) Inventor: Mingfang Zhang, Beijing (CN)

(73) Assignee: Vkansee (Beijing) Technology Co., Ltd., Beijing (CN)

( * ) Notice: Subject to any disclaimer, the term of this patent is extended or adjusted under 35 U.S.C. 154(b) by 51 days.

(21) Appl. No.: 15/560,443

(22) PCT Filed: Nov. 29, 2016

(86) PCT No.: PCT/CN2016/107616
§ 371 (c)(1),
(2) Date: Sep. 21, 2017

(87) PCT Pub. No.: WO2017/097145
PCT Pub. Date: Jun. 15, 2017

(65) Prior Publication Data
US 2018/0075278 A1 Mar. 15, 2018

(30) Foreign Application Priority Data
Dec. 11, 2015 (CN) .......................... 2015 1 0926853

(51) Int. Cl.
*G06K 9/00* (2006.01)
*G06K 9/20* (2006.01)
(52) U.S. Cl.
CPC ......... *G06K 9/00013* (2013.01); *G06K 9/209* (2013.01)
(58) Field of Classification Search
CPC .. G06K 9/00013; G06K 9/209; G06K 9/0004; G06K 9/20; G09F 9/302; G06F 3/147
See application file for complete search history.

(56) References Cited

U.S. PATENT DOCUMENTS

| 5,340,978 A | 8/1994 | Rostoker et al. |
| 7,629,962 B2 * | 12/2009 | Chiu .................. G06F 3/03543 345/156 |

(Continued)

FOREIGN PATENT DOCUMENTS

| CN | 1527243 A | 9/2004 |
| CN | 101034332 A | 9/2007 |

(Continued)

OTHER PUBLICATIONS

Supplementary European Search Report completed Sep. 10, 2018, for European Application No. EP16872336, 6 pages.

(Continued)

*Primary Examiner* — Bobbak Safaipour
(74) *Attorney, Agent, or Firm* — Bret E. Field; Bozicevic, Field & Francis LLP (57) ABSTRACT

A display screen having a fingerprint acquisition function includes a display screen cover plate (1), several display image elements (2) arranged below the display screen cover plate (1) and several photosensitive image elements (3). The several photosensitive image elements (3) are arranged below the display screen cover plate (1) and evenly distributed in gaps between the several display image elements (2). The photosensitive image element (3) includes a photosensitive element (4) and a field diaphragm (5), and a diaphragm hole (51) of the field diaphragm (5) is located above the photosensitive element (4). The photosensitive element (4) receives light emitted by the display image elements (2), reflected by a position of a finger surface contacted with the display screen cover plate (1), and entered into the photosensitive element through the diaphragm hole (51) of the field diaphragm (5). The photosensitive image elements (3) are implanted among the display image elements (2) of the display screen, and the photosensitive image elements (3) acquire fingerprint images by using the display image ele- (Continued)

ments (2) as light emitters, such that the display screen has a display function and a fingerprint recognition function. In this way, the integration, use convenience and user experience of the display is further improved.

8 Claims, 6 Drawing Sheets

(56) References Cited

U.S. PATENT DOCUMENTS

| | | |
|---|---|---|
| 2004/0184027 A1 | 9/2004 | Mizutani et al. |
| 2004/0252867 A1 | 12/2004 | Lan et al. |
| 2015/0310251 A1 | 10/2015 | Wyrwas et al. |
| 2015/0356285 A1 | 12/2015 | Glaser |

FOREIGN PATENT DOCUMENTS

| | | |
|---|---|---|
| CN | 101452137 A | 6/2009 |
| CN | 102727212 A | 10/2012 |
| CN | 104035620 A | 9/2014 |
| CN | 204028936 U | 12/2014 |
| CN | 204423387 U | 6/2015 |
| CN | 204463157 U | 7/2015 |
| CN | 204463158 U | 7/2015 |
| CN | 106022292 A | 10/2016 |
| CN | 205665716 U | 10/2016 |
| CN | 205880882 U | 1/2017 |
| JP | H11-120324 A | 4/1999 |
| JP | 2004-16407 A | 1/2004 |
| JP | 2009172263 A | 8/2009 |
| KR | 1020150131944 A | 11/2015 |
| RU | 2412460 C2 | 2/2011 |
| RU | 2012114160 A | 10/2013 |
| WO | WO2015149545 A1 | 10/2015 |
| WO | WO2015167711 A1 | 11/2015 |
| WO | WO2015192712 A1 | 12/2015 |

OTHER PUBLICATIONS

Substantive Examination Request and Search Report dated Aug. 20, 2018, for Russian Application No. 2017140192/08, with its English translation, 12 pages.

* cited by examiner

| D1 | D2 | D3 | S | D1 | D2 | D3 | S | D1 | D2 | D3 | S |
|----|----|----|---|----|----|----|---|----|----|----|---|
| D1 | D2 | D3 | S | D1 | D2 | D3 | S | D1 | D2 | D3 | S |
| D1 | D2 | D3 | S | D1 | D2 | D3 | S | D1 | D2 | D3 | S |

Fig.13

| D1 | D2 | D3 | D4 | S | D1 | D2 | D3 | D4 | S | D1 | D2 | D3 | D4 | S |
|----|----|----|----|---|----|----|----|----|---|----|----|----|----|---|
| D1 | D2 | D3 | D4 | S | D1 | D2 | D3 | D4 | S | D1 | D2 | D3 | D4 | S |
| D1 | D2 | D3 | D4 | S | D1 | D2 | D3 | D4 | S | D1 | D2 | D3 | D4 | S |

DISPLAY SCREEN HAVING FINGERPRINT ACQUISITION FUNCTION

This application is based upon and claims priority to Chinese Patent Application NO. 201510926853.2, titled "Display screen having fingerprint acquisition function", filed on Dec. 11, 2015, the entire contents of which are incorporated herein by reference.

FIELD OF TECHNOLOGY

The present disclosure relates to the field of image acquisition, and in particular, to a display screen having a fingerprint acquisition function.

BACKGROUND

A display is a display tool that displays an electronic file onto a display screen through a specific transmission device and then to human eyes. With the popularity of smart phones and tablet computers, the man-machine interface technology represented by a touch screen has been popular with people. At present, more and more display manufacturers have begun to research and launch a display screen that has a fingerprint recognition function.

For the existing display screen having the fingerprint recognition function, it is generally necessary to design a fingerprint collector independent of the display screen or provide a fingerprint collector at a designated position of the display. Since the fingerprint collector is independent of the display screen and is connected to the display screen through a corresponding data line, the fingerprint collector integrated into the display as a whole can only be arranged at the designated position of the edge of the display, which causes the existing display screen having the fingerprint recognition function to have disadvantages of inconvenience, low integration and poor user experience.

SUMMARY

An object of the disclosure is to provide a display screen having a fingerprint acquisition function, which is capable of providing convenient use and improved integration and user experience.

A display screen having a fingerprint acquisition function is provided according to an embodiment of the disclosure, which includes: a display screen cover plate, and several display image elements arranged below the display screen cover plate, and further includes: several photosensitive image elements arranged below the display screen cover plate and evenly distributed in gaps among the several display image elements.

The photosensitive image element includes a photosensitive element and a field diaphragm. A diaphragm hole of the field diaphragm is located above the photosensitive element.

The photosensitive element receives light which is emitted by the display image elements, reflected by a position of a surface of a finger contacted with the display screen cover plate and entered into the photosensitive element through the diaphragm hole of the field diaphragm.

As a preferred embodiment, the photosensitive image element includes a right photosensitive image element. A photosensitive element of the right photosensitive image element is placed horizontally. A central line of a diaphragm hole of the right photosensitive image element is perpendicular to a top surface of the photosensitive element.

A field angle of a field diaphragm of the right photosensitive image element is in a range from negative 45 degrees to positive 45 degrees.

As a preferred embodiment, the photosensitive image element includes an inclined photosensitive image element. A photosensitive element of the inclined photosensitive image element is placed horizontally, and an angle between a central line of a diaphragm hole of the inclined photosensitive image element and a top surface of the photosensitive element is in a range of $\arcsin(n_1/n_2) \leq \alpha \leq \arcsin(n_3/n_2)$ where $n_1$ is a refractive index of an external medium of the display screen cover plate, $n_2$ is a refractive index of the display screen cover plate, and $n_3$ is a refractive index of the surface of the finger.

As a preferred embodiment, the photosensitive image element includes a right photosensitive image element and an inclined photosensitive image element.

A photosensitive element of the right photosensitive image element is placed horizontally, and a central line of a diaphragm hole of the right photosensitive image element is perpendicular to a top surface of the photosensitive element, and An angle between a central line of a diaphragm hole of the inclined photosensitive image element and a top surface of the photosensitive element is in a range of $\arcsin(n_1/n_2) \leq \alpha \leq \arcsin(n_3/n_2)$, where $n_1$ is a refractive index of an external medium of the display screen cover plate, $n_2$ is a refractive index of the display screen cover plate, and $n_3$ is a refractive index of the surface of the finger.

Each of the photosensitive image elements includes one or more diaphragm holes.

Preferably, the diaphragm hole is a round hole, an elliptical hole or a slit.

As can be seen, in the display screen according to the disclosure, the photosensitive image elements are disposed among the display image elements, and the photosensitive image elements acquire fingerprint images by using the display image elements as light emitters. In this way, the display screen has a display function and a fingerprint recognition function, thereby improving integration, use convenience and user experience of a display.

BRIEF DESCRIPTION OF THE DRAWINGS

In order to more clearly illustrate the technical solutions of the embodiments of the present disclosure or of the prior art, the drawings needed in the description of the embodiments are briefly introduced below. Apparently, the drawings in the description below are only some embodiments of the present disclosure, and other drawings may also be obtained by one of ordinary skills in the art according to these drawings without creative work.

DETAILED DESCRIPTION

The technical solutions in the embodiments of the present disclosure are described clearly and fully below in conjunction with the drawings in the embodiments of the present disclosure. Apparently, the embodiments described are only a part of the embodiments of the present disclosure, rather than being the whole embodiments. All the other embodiments obtained by one of ordinary skills in the art based on the embodiments of the present disclosure without creative work pertain to the protection scope of the present disclosure.

The fingerprint acquisition function of the existing display is achieved generally by providing a fingerprint collector independent of the display or by providing a fingerprint recognizer at a designated position of an edge of the display. The inventors of the present disclosure have found that the display screen of the display may have both a display function and a fingerprint recognition function by incorporating a fingerprint acquisition device into a display screen, and using the light emitted by the display image element in the display screen as a working light source of the fingerprint acquisition device. In this way, there is no need to provide a separate fingerprint acquisition device, and any position on the display screen can be touched to acquire a fingerprint image, thereby further improving integration, use convenience and user experience of a display.

The structure and operational principle of a display screen having a fingerprint acquisition function in the disclosure are set forth in details by means of specific embodiments below.

Figure 1:
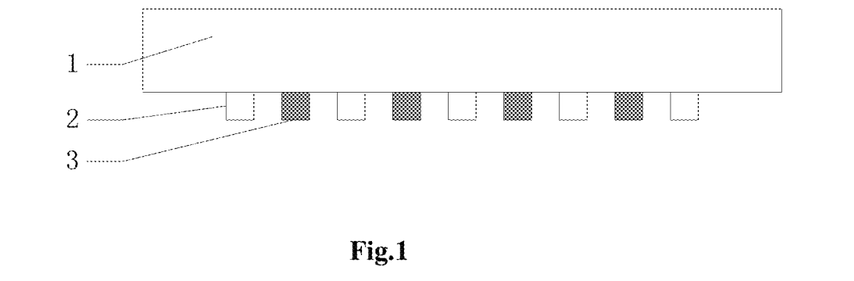
FIG. 1 is a schematic diagram of a structure of a display screen having a fingerprint acquisition function according to a preferred embodiment.

FIG. 1 is a schematic diagram of a structure of a display screen having a fingerprint acquisition function according to a preferred embodiment. As shown in FIG. 1, the display screen includes a display screen cover plate 1, several display image elements 2, and several photosensitive image elements 3. The several display image elements 2 are arranged below the display screen cover plate 1, and the several photosensitive image elements 3 are evenly and regularly distributed in gaps among the several display image elements 2.

Figure 2:
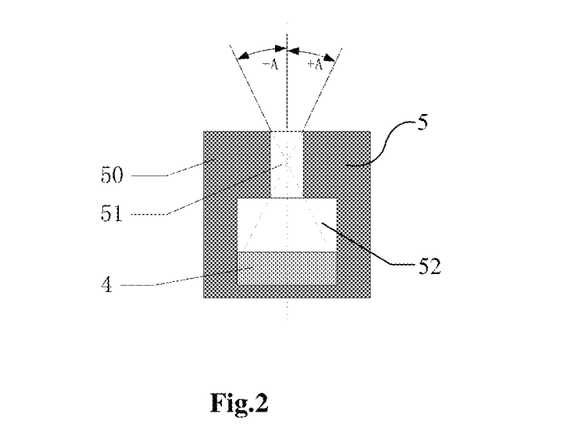
FIG. 2 is a schematic diagram of a structure of a photosensitive image element according to a preferred embodiment.

FIG. 2 is a schematic diagram of a structure of a photosensitive image element according to a preferred embodiment. As shown in FIG. 2, a photosensitive image element 3 includes a photosensitive element 4 and a field diaphragm 5. The field diaphragm 5 includes a light isolating frame 50, and a diaphragm hole 51 and a receiving hole 52 surrounded by the light isolating frame. The photosensitive element 4 is arranged in the receiving hole 52 and placed horizontally. The diaphragm hole 51 is located above the photosensitive element 4, and a central line of the diaphragm hole 51 is perpendicular to a top surface of the photosensitive element 4. A field angle A of the field diaphragm 5 is in a range from negative 45 degrees to positive 45 degrees.

Figure 3:
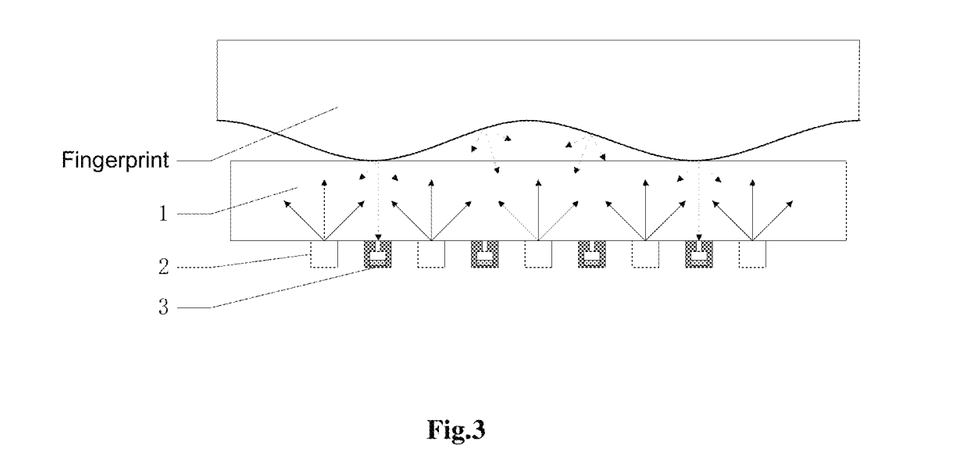
FIG. 3 is an operational principle diagram of a display screen having a fingerprint acquisition function when a photosensitive image element has the structure shown in FIG. 2.

FIG. 3 is an operational principle diagram of a display screen having a fingerprint acquisition function when a photosensitive image element has the structure shown in FIG. 2. As shown in FIG. 3, the display image elements 2 of the display screen emit light after the display screen is powered. In this disclosure, the display image elements are used as a light emitter. Ridges and valleys are distributed on a surface of a finger. When a finger is touching the display screen cover plate 1, the ridges on the surface of the finger is in close contact with the display screen cover plate 1. A part of the light emitted by the display image elements 2 is reflected on a position of the surface of the finger contacted with the display screen cover plate 1. The light reflected in the vertical direction is strong. The light reflected in the vertical direction enters the photosensitive element 4 through the diaphragm hole of the field diaphragm 5, and thus the intensity of the light received by the photosensitive element 4 is also strong. In this case, images corresponding to the ridges have high brightness. The valleys on the surface of the finger do not contact the display screen cover plate 1 and have a distance from the display screen cover plate 1, thus the light reflected thereon in the vertical direction is relatively weak, and the intensity of the light received by the photosensitive element 4 is also weak. In this case, images corresponding to the valleys have low brightness. So the entire fingerprint image appears as light and dark stripes.

Figure 4:
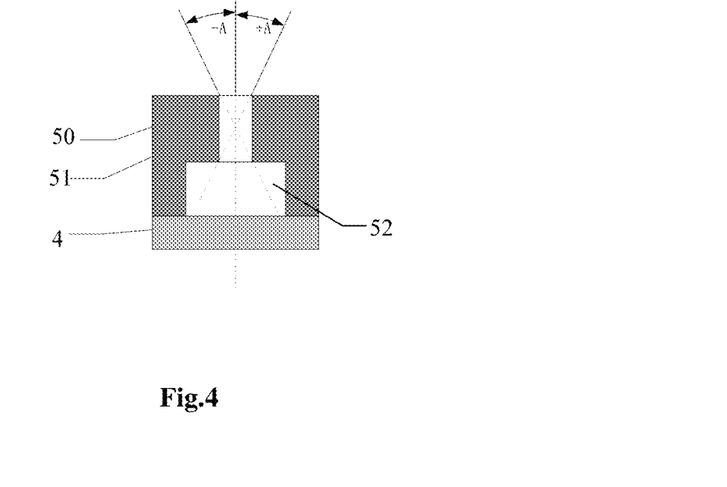
FIG. 4 is a schematic diagram of a structure of a photosensitive image element according to another preferred embodiment.

The structure of the photosensitive image element shown in FIG. 2 is just exemplary, and the structure of the photosensitive image element may be the structure shown in FIG. 4. That is, the photosensitive element 4 of the photosensitive image element may be not arranged in the receiving hole surrounded by the light isolating frame, but may be directly arranged below the field diaphragm 5. The operational principle thereof is the same as that of the photosensitive image element shown in FIG. 2.

Figure 5:
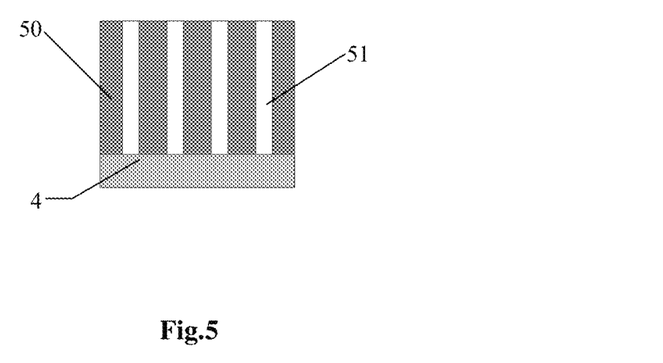
FIG. 5 is a schematic diagram of a structure of a photosensitive image element when a plurality of diaphragm holes exist.

In the disclosure, a plurality of diaphragm holes are provided on the photosensitive image element 3. When the photosensitive image element 3 has the plurality of diaphragm holes, the central lines of the plurality of diaphragm holes are parallel to each other. FIG. 5 is a schematic diagram of a structure of a photosensitive image element when a plurality of diaphragm holes exist.

In the structure of the photosensitive image element shown in FIG. 2, FIG. 4 and FIG. 5, a central line of a diaphragm hole is perpendicular to a top surface of the photosensitive element, and the photosensitive image element is called as a right photosensitive image element in the disclosure.

It should be noted that the structure of the photosensitive image element shown in FIG. 2, FIG. 4 and FIG. 5 is just exemplary, and the number of diaphragm holes and a shape of the diaphragm holes in the photosensitive image element are not specifically defined in the disclosure. The shape of the diaphragm holes in the photosensitive image element includes, but is not limited to, a round hole, an elliptical hole or a slit.

The display screen with the right photosensitive image element, when being used for fingerprint acquisition, has an advantage of good adaptability for a dry/wet finger. That is, a fingerprint image of stable quality can be acquired for the dry/wet finger.

Figure 6:
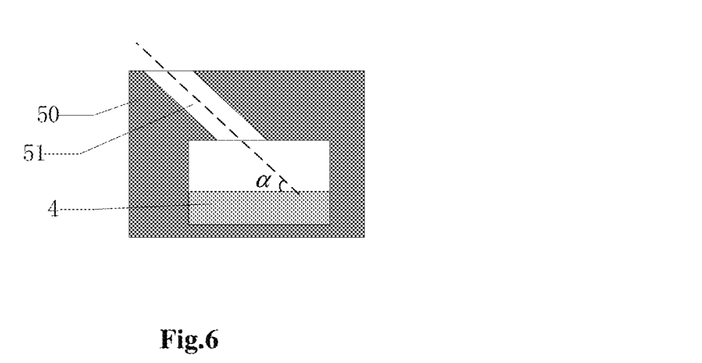
FIG. 6 is a schematic diagram of a structure of a photosensitive image element according to another preferred embodiment.

FIG. 6 is a schematic diagram of a structure of a photosensitive image element according to another preferred embodiment. As shown in FIG. 6, the photosensitive image element 3 includes a photosensitive element and a field diaphragm 5. The field diaphragm 5 includes a light isolating frame, and a diaphragm hole and a receiving hole surrounded by the light isolating frame. The photosensitive element is arranged in the receiving hole and placed horizontally. The diaphragm hole is located above the photosensitive element, and an angle between a central line of the diaphragm hole and a top surface of the photosensitive element is in a range of $\arcsin(n_1/n_2) \leq \alpha \leq \arcsin(n_3/n_2)$ (formula 1), where $n_1$ is a refractive index of an external medium of the display screen cover plate, $n_2$ is a refractive index of the display screen cover plate, and $n_3$ is a refractive index of the surface of the finger.

Before the operational principle diagram of the display screen with the photosensitive image element having a structure shown in FIG. 6 is described, a frustrated total internal reflection angle for the light emitted by the display image element are defined firstly.

Figure 7:
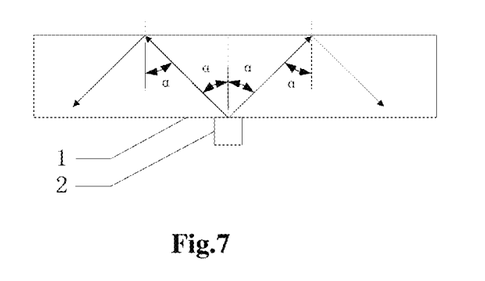
FIG. 7 is a light diagram of light emitted by a display image element in a display screen.

FIG. 7 is a light diagram of light emitted by a display image element in a display screen. As shown in FIG. 7, a part of the light emitted by the display image element propagates by total internal reflection at the interface between the display screen cover plate and air. It is assumed that the refractive index of the display screen cover plate is $n_2$, the refractive index of an external medium (generally, air) of the display screen cover plate is $n_1$ when no finger is touching the plate, and a refractive index of the surface of the finger is $n_3$. Emergence angles of a part of the light emitted by the display image element 2 meet that the part of the light can propagate by total internal reflection when the external medium of the display screen cover plate is air and cannot propagate by total internal reflection when the external medium of the display screen cover plate is skin. Typically, suppose $n_1=1.0$, $n_2=1.5$, $n_3=1.33$, an angle range of 41.8 degrees $\leq \alpha \leq$ 62.5 degrees is obtained by calculating arcsin (1/1.5) and arcsin (1.33/1.5) based on formula 1. The emergence angle of the light within the above angle range is defined as the frustrated total internal reflection angle, and the light in the above angle range is called as frustrated light.

When the external medium of the display screen cover plate is a skin of a finger, the total internal reflection of the frustrated light is frustrated, and a part of energy passes through the reflective interface and is projected on the surface of the finger to be scattered or absorbed, thus the energy of light reflected is reduced. A fingerprint image is acquired based on this mechanism.

Figure 8:
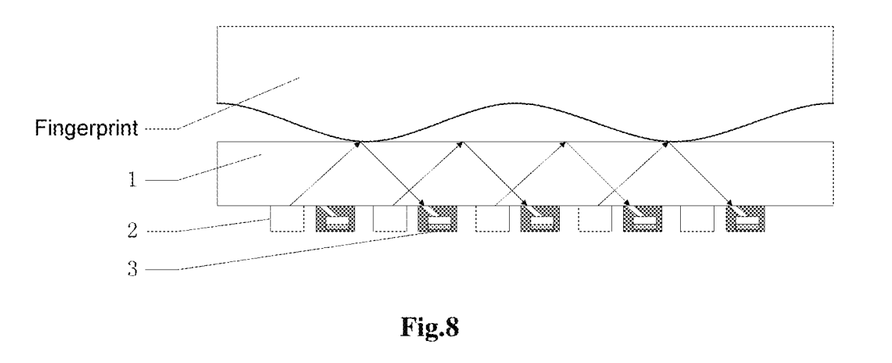
FIG. 8 is an operational principle diagram of a display screen having a fingerprint acquisition function when a photosensitive image element has the structure shown in FIG. 6.

FIG. 8 is an operational principle diagram of a display screen having a fingerprint acquisition function when a photosensitive image element has the structure shown in FIG. 6. As shown in FIG. 8, the display image elements 2 of the display screen emit light after the display screen is powered, and only the frustrated light emitted by the display image elements 2 is shown in FIG. 8. The frustrated light emitted by the display image elements 2 is reflected at the interface between the display screen cover plate and air, and is projected on the photosensitive element through the diaphragm hole of the photosensitive image element. When a finger is touching the display screen cover plate 1, the ridges on the surface of the finger is in contact with the display screen cover plate 1, and the total internal reflection of the frustrated light is frustrated. A part of the light escapes from the display screen cover plate 1, so that the energy of light on a reflected light path is reduced and the intensity of the light received by the photosensitive element is reduced. In this case, images corresponding to the ridges have low brightness. The valleys on the surface of the finger do not contact the display screen cover plate 1, and the air still exists between the valleys and the display screen cover plate 1, thus the total internal reflection of the frustrated light is not frustrated. Thus, the energy of light on the reflected light path remains unchanged and the intensity of the light received by the photosensitive element remains unchanged. In this case, images corresponding to the valleys have high brightness.

Figure 9:
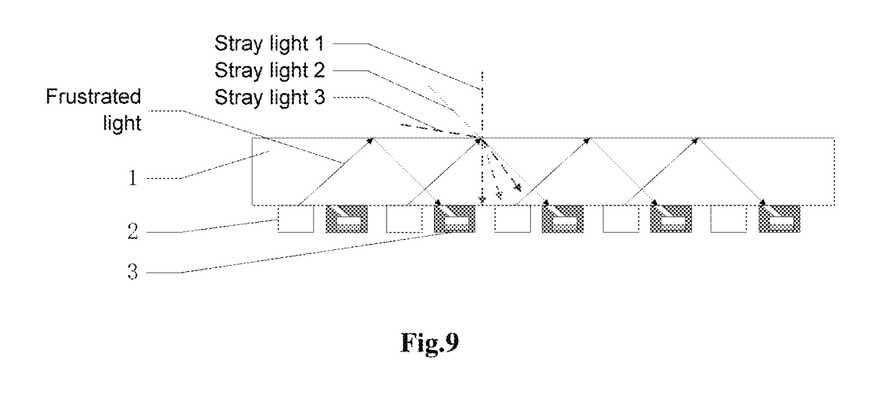
FIG. 9 shows a diagram of stray light entering a display screen cover plate by being refracted.

It can be easily concluded according to the law of refraction that, the external stray light is refracted when entering the display screen cover plate 1, and the refracted angle is certainty smaller than the total internal reflection angle and thus is beyond the reception range of an inclined photosensitive image element. FIG. 9 shows a diagram of stray light entering a display screen cover plate by being refracted. Therefore, the display screen with the photosensitive image element shown in FIG. 7 is not affected by the external stray light, when performing fingerprint acquisition. As can be seen from FIG. 9, a clear and low-noise fingerprint image can be obtained easily by using the frustrated total internal reflection light.

Figure 10:
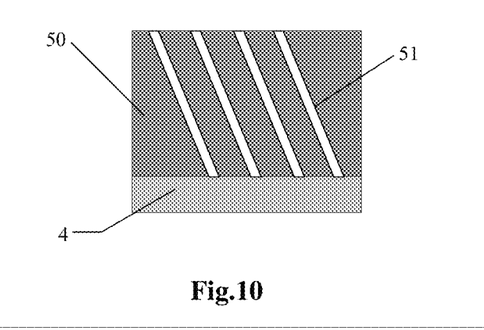
FIG. 10 is a schematic diagram of a structure of a photosensitive image element according to another preferred embodiment.

The structure of the photosensitive image element shown in FIG. 6 is just exemplary, and the structure of the photosensitive image element may be similar to the structure shown in FIG. 4. FIG. 10 is a schematic diagram of a structure of a photosensitive image element according to another preferred embodiment. As shown in FIG. 10, the photosensitive element of the photosensitive image element may be not arranged in the receiving hole surrounded by the light isolating frame, but may be directly arranged below the field diaphragm 5. An angle between a central line of the diaphragm hole and a top surface of the photosensitive element is $\alpha$.

The photosensitive image element in which the angle between the central line of the diaphragm hole and the top surface of the photosensitive element is $\alpha$ shown in FIG. 6 is called as an inclined photosensitive image element in the disclosure. A plurality of diaphragm holes may be provided on the inclined photosensitive image element. When the inclined photosensitive image element has the plurality of diaphragm holes, an angle between a central line of each of the diaphragm holes and the top surface of the photosensitive element is $\alpha$. The number of the diaphragm holes and a shape of the diaphragm holes in the inclined photosensitive image element are not specifically defined in the disclosure. The shape of the diaphragm holes in the inclined photosensitive image element includes, but is not limited to, a round hole, an elliptical hole or a slit.

Figure 11:
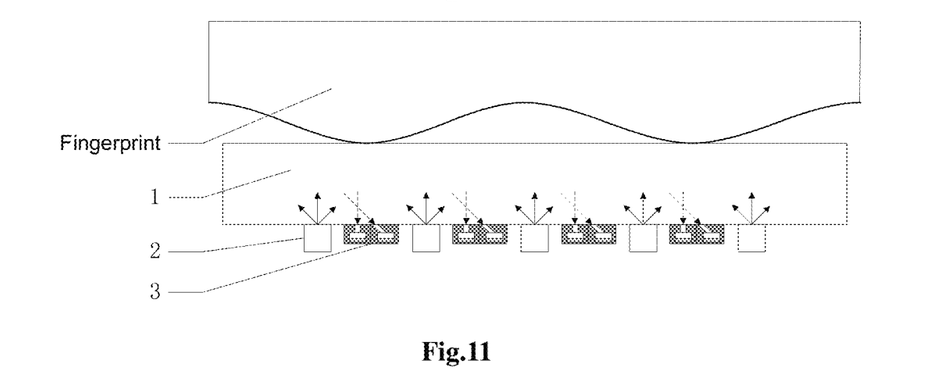
FIG. 11 shows an operational principle diagram of a display screen with a multi-angle photosensitive image element for fingerprint acquisition.

In order to obtain a better fingerprint image, it is further preferred that the right photosensitive image element and the inclined photosensitive image element are combined to construct a multi-angle photosensitive image element in the display screen in the disclosure. FIG. 11 shows an operational principle diagram of a display screen with a multi-angle photosensitive image element for fingerprint acquisition. Output information of the right photosensitive image element and output information of the inclined photosensitive image element are combined by the multi-angle photosensitive image element to obtain a fingerprint image of good quality in conjunction with the respective advantages.

A method of implanting several photosensitive image elements among several display image elements is described in details below.

Figure 12:
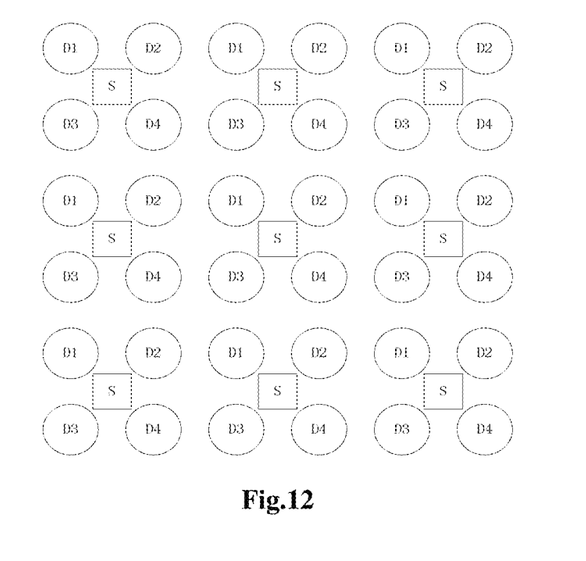
FIG. 12 is a method for implanting a photosensitive image element according to a preferred embodiment.

In the disclosure, several image element groups are composed of several display image elements and several photosensitive image elements. FIG. 12 is a method of implanting a photosensitive image element according to a preferred embodiment. As shown in FIG. 12, each of the image element groups includes one photosensitive image element and four display image elements, connection lines among centers of the four display image elements constitutes a square, the photosensitive image element is located in the center of the square, and the image element groups are arranged in a matrix. D1, D2, D3 and D4 represent display image elements. For a color display screen, D1, D2, D3 and D4 may be in different colors, such as Red, Green, Blue, Dark, or White. S represents the photosensitive image element, which may be a right photosensitive image element, an inclined photosensitive image element, or a multi-angle photosensitive image element.

As another preferred implanting method, each of the image element groups includes one photosensitive image element and n display image elements, and the one photosensitive image element and the n display image elements are arranged in straight line, where n is a natural number greater than or equal to 2. The image element groups are arranged in a matrix.

Figure 13:
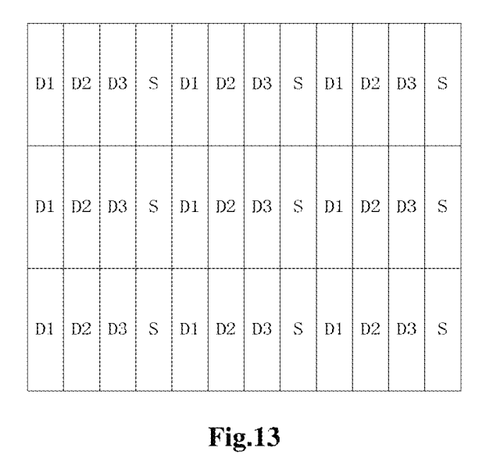
FIG. 13 shows an arrangement diagram of an image element group in which one photosensitive image element and three display image elements constitute a linear queue.
Figure 14:
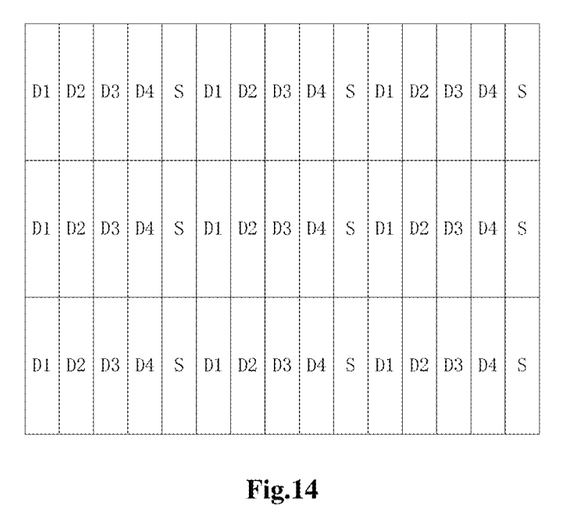
FIG. 14 shows an arrangement diagram of an image element group in which one photosensitive image element and four display image elements constitute a linear queue.

It should be noted that, in the embodiment, in a linear queue is composed of one photosensitive image element and n display image elements, the position of the photosensitive image element is not specifically defined, and may be at the far left, the far right, or the middle of the queue. FIG. 13 shows an arrangement diagram of an image element group in which one photosensitive image element and three display image elements constitute a linear queue. FIG. 14 shows an arrangement diagram of an image element group in which one photosensitive image element and four display image elements constitute a linear queue.

Figure 15:
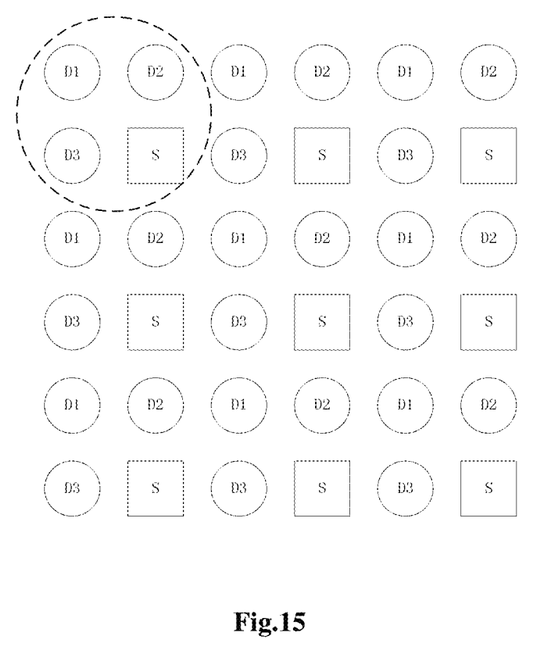
FIG. 15 shows an arrangement diagram of an image element group of 2*2 composed of one photosensitive image element and three display image elements.

As another preferred implanting method, each of the image element groups includes one photosensitive image element and (n2-1) display image elements, and the one photosensitive image element and the (n2-1) display image elements are arranged in a n*n matrix, where n is a natural number greater than or equal to 2. The image element groups are arranged in a matrix. FIG. 15 shows an arrangement diagram of an image element group of 2*2 composed of one photosensitive image element and three display image elements.

It should be noted that, the method of implanting several photosensitive image elements described above is just exemplary, and all implanting methods in which the photosensitive image elements can be evenly distributed among several display image elements and a fingerprint image can be obtained by the photosensitive image elements fall into the protective scope of the disclosure.

As can be seen, in the display screen according to the disclosure, the photosensitive image elements are implanted among the display image elements, and the photosensitive image elements acquire fingerprint images by using the display image elements as light emitters. In this way, the display screen has a display function and a fingerprint recognition function, thereby improving integration, use convenience and user experience of a display.

Considering the specification and practice of the present disclosure, those skilled in the art readily envisage other embodiments of the disclosure. This application is intended to cover any variations, uses, or adaptations of the disclosure. These variations, uses, or adaptations comply with general principles of the application and include common knowledge or customary technical means in the art which are not disclosed in the disclosure. The specification and embodiments are just taken to be exemplary, and the actual scope and spirit of the disclosure is defined by the following claims.

It is to be understood that the disclosure is not limited to the precise methods described above and shown in drawings, and various changes and modifications may be made without departing from the scope of the disclosure. The scope of the present disclosure is defined by only the appended claims.

What is claimed is:

1. A display screen having a fingerprint acquisition function, comprising a display screen cover plate, several display image elements arranged below the display screen cover plate, wherein the display screen further comprises:
   several photosensitive image elements arranged below the display screen cover plate and evenly distributed in gaps among the several display image elements,
   wherein the photosensitive image element comprises a photosensitive element and a field diaphragm, and a diaphragm hole of the field diaphragm is located above the photosensitive element; and
   the photosensitive element receives light which is emitted by the display image elements, reflected by a position of a surface of a finger contacted with the display screen cover plate and entered into the photosensitive element through the diaphragm hole of the field diaphragm, wherein the photosensitive image element comprises a right photosensitive image element, wherein a photosensitive element of the right photosensitive image element is placed horizontally, and a central line of a diaphragm hole of the right photosensitive image element is perpendicular to a top surface of the photosensitive element.

2. The display screen according to claim 1, wherein a field angle of a field diaphragm of the right photosensitive image element is in a range from negative 45 degrees to positive 45 degrees.

3. The display screen according to claim 1, wherein each of the photosensitive image elements comprises one or more diaphragm holes.

4. The display screen according to claim 3, wherein the diaphragm hole is a round hole, an elliptical hole or a slit.

5. A display screen having a fingerprint acquisition function, comprising a display screen cover plate, several display image elements arranged below the display screen cover plate, wherein the display screen further comprises:
   several photosensitive image elements arranged below the display screen cover plate and evenly distributed in gaps among the several display image elements,
   wherein the photosensitive image element comprises a photosensitive element and a field diaphragm, and a diaphragm hole of the field diaphragm is located above the photosensitive element; and
   the photosensitive element receives light which is emitted by the display image elements, reflected by a position of a surface of a finger contacted with the display screen cover plate and entered into the photosensitive element through the diaphragm hole of the field diaphragm, wherein the photosensitive image element comprises an inclined photosensitive image element, wherein a photosensitive element of the inclined photosensitive image element is placed horizontally, and an angle between a central line of a diaphragm hole of the inclined photosensitive image element and a top surface of the photosensitive element is in a range of $\arcsin(n_1/n_2) \leq \alpha \leq \arcsin(n_3/n_2)$ where $n_1$ is a refractive index of an external medium of the display screen cover plate, $n_2$ is a refractive index of the display screen cover plate, and $n_3$ is a refractive index of the surface of the finger.

6. The display screen according to claim 5, wherein the photosensitive image element further comprises a right photosensitive image element, and wherein a photosensitive element of the right photosensitive image element is placed horizontally, and a central line of a diaphragm hole of the right photosensitive image element is perpendicular to a top surface of the photosensitive element.

7. The display screen according to claim 5, wherein each of the photosensitive image elements comprises one or more diaphragm holes.

8. The display screen according to claim 7, wherein the diaphragm hole is a round hole, an elliptical hole or a slit.

* * * * *